(12) United States Patent
Helin et al.

(10) Patent No.: US 12,458,637 B2
(45) Date of Patent: Nov. 4, 2025

(54) TARGETING WNK1 IN BLOOD CANCERS

(71) Applicant: Københavns Universitet, Copenhagen K (DK)

(72) Inventors: Kristian Helin, Copenhagen N (DK); Karl Agger, Copenhagen N (DK)

(73) Assignee: Københavns Universitet, Copenhagen K (DK)

(*) Notice: Subject to any disclaimer, the term of this patent is extended or adjusted under 35 U.S.C. 154(b) by 821 days.

(21) Appl. No.: 17/633,905

(22) PCT Filed: Aug. 11, 2020

(86) PCT No.: PCT/EP2020/072514
§ 371 (c)(1),
(2) Date: Feb. 8, 2022

(87) PCT Pub. No.: WO2021/028438
PCT Pub. Date: Feb. 18, 2021

(65) Prior Publication Data
US 2022/0288063 A1 Sep. 15, 2022

(30) Foreign Application Priority Data
Aug. 12, 2019 (EP) .................................... 19191246

(51) Int. Cl.
*A61K 31/496* (2006.01)
*A61P 35/02* (2006.01)

(52) U.S. Cl.
CPC ............ *A61K 31/496* (2013.01); *A61P 35/02* (2018.01)

(58) Field of Classification Search
CPC .................................................. A61K 31/496
See application file for complete search history.

(56) References Cited

U.S. PATENT DOCUMENTS

| | | |
|---|---|---|
| 2003/0082720 A1 | 5/2003 | Lifton et al. |
| 2008/0286809 A1 | 11/2008 | Alessi et al. |

FOREIGN PATENT DOCUMENTS

| | | |
|---|---|---|
| CN | 102408484 A | 4/2012 |
| WO | WO 01/38503 A2 | 5/2001 |
| WO | WO 2016/107933 A2 | 7/2016 |

OTHER PUBLICATIONS

Sachith Gallolu Kankanamalge et al., Cell Communication and Signaling 2018, 1-6.*

Alamri, Mubarak A. et al., "WNK Signaling Inhibitors as Potential Antihypertensive Drugs" ChemMedChem, 2017, pp. 1677-1686, vol. 12.
Chen, Wanyin et al., "WNK1 kinase and its partners Akt, SGK1 and NBC-family $Na^+/HCO3^-$ cotransporters are potential therapeutic targets for glioblastoma stem-like cells linked to Bisacodyl signaling" Oncotarget, 2018, pp. 27197-27219, vol. 9, No. 43.
De Luca, Carl et al., "Complete rescue of obesity, diabetes, and infertility in db/db mice by neuron-specific LEPR-B transgenes" The Journal of Clinical Investigation, Dec. 2005, pp. 3484-3493, vol. 115, No. 12.
Hsu, Ya-Ling et al., "Lung cancer-derived galectin-1 contributes to cancer associated fibroblast-mediated cancer progression and immune suppression through TDO2/kynurenine axis" Oncotarget, Mar. 2016, pp. 27584- 27598, vol. 7, No. 19.
Ishigami-Yuasa, Mari et al., "Development of WNK signaling inhibitors as a new class of antihypertensive drugs" Bioorganic & Medicinal Chemistry, 2017, pp. 3845-3852, vol. 25.
Köchl, Robert et al., "WNK1 kinase balances T cell adhesion versus migration in vivo" Nat Immunol., Sep. 2016, pp. 1075-1083, vol. 17, No. 9.
Muntean, Andrew G. et al., "The PAF Complex Synergizes with MLL Fusion Proteins at HOX Loci to Promote Leukemogenesis" Cancer Cell, Jun. 2010, pp. 609-621, vol. 17.
Pio, Graciella M. et al., "Soluble bone-derived osteopontin promotes migration and stem-like behavior of breast cancer cells" PLoS ONE, May 2017, pp. 1-20, vol. 12, No. 5, e0177640.
Shyamasundar, Sukanya et al., "miR-93 inhibits the invasive potential of triple-negative breast cancer cells in vitro via protein kinase WNK1" International Journal of Oncology, 2016, pp. 2629-2636, vol. 49.
Tsuboi, Makiko et al., "Vav3 is linked to poor prognosis of pancreatic cancers and promotes the motility and invasiveness of pancreatic cancer cells" Pancreatology, 2016, pp. 905-916, vol. 16.
Xie, Jian et al., "WNK1 Protein Kinase Regulates Embryonic Cardiovascular Development through the OSR1 Signaling Cascade" The Journal of Biological Chemistry, Mar. 2013, pp. 8566-8574, vol. 288, No. 12.
Yamada, Ken et al., "Discovery and Characterization of Allosteric WNK Kinase Inhibitors" ACS Chem. Biol., 2016, pp. 3338-3346, vol. 11.
Yamada, Ken et al., "Small-molecule WNK inhibition regulates cardiovascular and renal function" Nature Chemical Biology, Nov. 2016, pp. 896-898, vol. 12.
Yamada, Ken et al., "Optimization of Allosteric With-No. Lysine (WNK) Kinase Inhibitors and Efficacy in Rodent Hypertension Models" J. Med. Chem., 2017, pp. 7099-7107, vol. 60.
Zhang, Ya-Juan et al., "WNK1 is required for proliferation induced by hypotonic challenge in rat vascular smooth muscle cells" Acta Pharmacologica Sinica, 2018, pp. 35-47, vol. 39.
International Search Report for PCT/EP2020/072514 dated Nov. 4, 2020.

* cited by examiner

*Primary Examiner* — Shobha Kantamneni
(74) *Attorney, Agent, or Firm* — Knobbe, Martens, Olson & Bear LLP

(57) ABSTRACT

The present invention relates to lysine deficient protein kinase 1 (WNK1) inhibitors for use in treating patients with blood cancers, in particular leukemia and multiple myeloma.

8 Claims, 13 Drawing Sheets
Specification includes a Sequence Listing.

SEQUENCE LISTING

<160> NUMBER OF SEQ ID NOS: 7

<210> SEQ ID NO 1
<211> LENGTH: 20
<212> TYPE: DNA
<213> ORGANISM: Lentivirus

```
<220> FEATURE:
<221> NAME/KEY: misc_RNA
<222> LOCATION: (1)..(20)

<400> SEQUENCE: 1
tggtctggca actctaaagc                                               20

<210> SEQ ID NO 2
<211> LENGTH: 20
<212> TYPE: DNA
<213> ORGANISM: Lentivirus
<220> FEATURE:
<221> NAME/KEY: misc_RNA
<222> LOCATION: (1)..(20)

<400> SEQUENCE: 2
tctggacacc gaaaccactg                                               20

<210> SEQ ID NO 3
<211> LENGTH: 20
<212> TYPE: DNA
<213> ORGANISM: Lentivirus
<220> FEATURE:
<221> NAME/KEY: misc_RNA
<222> LOCATION: (1)..(20)

<400> SEQUENCE: 3
attctcttgg ttctaggtcc                                               20

<210> SEQ ID NO 4
<211> LENGTH: 20
<212> TYPE: DNA
<213> ORGANISM: Lentivirus
<220> FEATURE:
<221> NAME/KEY: misc_RNA
<222> LOCATION: (1)..(20)

<400> SEQUENCE: 4
gacgtctaat ttctggccgt                                               20

<210> SEQ ID NO 5
<211> LENGTH: 20
<212> TYPE: DNA
<213> ORGANISM: Lentivirus
<220> FEATURE:
<221> NAME/KEY: misc_RNA
<222> LOCATION: (1)..(20)

<400> SEQUENCE: 5
gccgtgggaa tgtctaacga                                               20

<210> SEQ ID NO 6
<211> LENGTH: 20
<212> TYPE: DNA
<213> ORGANISM: Lentivirus
<220> FEATURE:
<221> NAME/KEY: misc_RNA
<222> LOCATION: (1)..(20)

<400> SEQUENCE: 6
cgaatgggtg gataccgtca                                               20

<210> SEQ ID NO 7
<211> LENGTH: 20
<212> TYPE: DNA
<213> ORGANISM: Lentivirus
<220> FEATURE:
```

```
<221> NAME/KEY: misc_RNA
<222> LOCATION: (1)..(20)

<400> SEQUENCE: 7
cccgcatgac accgtcactt                                                    20
```

TARGETING WNK1 IN BLOOD CANCERS

CROSS REFERENCE TO RELATED APPLICATIONS

This application is a U.S. National Phase application of PCT International Application Number PCT/EP2020/072514, filed on Aug. 11, 2020, designating the United States of America and published in the English language, which is an International Application of and claims the benefit of priority to European Patent Application No. 19191246.8, filed on Aug. 12, 2019. The disclosures of the above-referenced applications are hereby expressly incorporated by reference in their entireties.

REFERENCE TO SEQUENCE LISTING

A Sequence Listing submitted as an ASCII text file via EFS-Web is hereby incorporated by reference in accordance with 37 U.S.C. § 1.52 (e). The name of the ASCII text file for the Sequence Listing is SeqList-PLOUG12-004APC.txt, the date of creation of the ASCII text file is Feb. 7, 2022, and the size of the ASCII text file is 2 KB.

TECHNICAL FIELD OF THE INVENTION

The present invention relates to lysine deficient protein kinase 1 (WNK1) inhibitors for use in treating patients with blood cancers, in particular leukemia and multiple myeloma.

BACKGROUND OF THE INVENTION

Currently, there is no effective treatment available for multiple myeloma, whereas 70% of patients with acute myeloid leukemia will die within five years. The inventors have shown that reducing the activity of WNK1 is toxic to cells of leukemic and myeloma origin and has less deleterious effects on normal cells.

Interestingly, WNK1 has a well-described role in an inherited form of e.g. hypertension but has not previously been linked to blood cancer. Due to the role of WNK1 in hypertension several small molecule inhibitors are currently being developed with the scope of using them to treat increased blood pressure.

US20080286809A1 discloses that the rate of autophosphorylation of endogenously expressed WNK1 is increased ~5-fold by hypertonic stress in kidney epithelial cells and in breast and colon cancer cell lines. These conditions are well known to stimulate NKCC1 (Na—K-CL cotransporter) activity by inducing its phosphorylation, leading to increased uptake of $Na^+$ and $K^+$ ions to maintain cell volume.

US2003/0082720A1 discloses nucleic acids encoding a mammalian WNK, and proteins 25 encoded thereby, preferably, human WNK1 and human WNK4. US2003/0082720A1 discloses that these nucleic acids, and mutant forms thereof, are associated with, inter alia, renal electrolyte handling, hypertension, and pseudohypoaldosterism type II (PHAII).

CN102408484A, discloses a recombined membrane-penetrating peptide with a WNK kinase 30 inhibiting effect. Serving as a specific inhibitor of WNK serine/threonine kinase, the recombined membrane-penetrating peptide can be used for reducing the activity of NKCC1 activated by the WNK kinase after being combined with the WNK kinase, thus specifically reducing the $Cl^-$ in neuron cells of spinal cord dorsal root ganglion (DRG) and trigeminal ganglion, inhibiting the excitability action of GABA (gamma-amino butyric acid) in the DRG 35 and inhibiting the transfer of pain sense.

WO16107933A2 discloses a method of treating cancer using a combination of miRNA-152 inhibition and miRNA 150 expression based on experimental data showing this combination leading to complete growth inhibition of multiple types of cancers in vivo.

Among a long list of cancer to be treated is preferably a solid tumor, but could be any tumor including, but not limited to, leukemia.

WO0138503 A2 discloses phosphatase polypeptides, nucleotide sequences encoding the phosphatase polypeptides, as well as various products and methods useful for the diagnosis and treatment of various phosphatase-related diseases and conditions. WO0138503 A2 discloses that WNK3 shows high expression in human kidney, in kidney carcinoma cell lines, in prostate, prostate cell lines, and prostate tumor bone metastases, in colorectal tissue and tumor cell lines, and in human leukemia cells.

Yamada K, J Med Chem. (2017); 60(16):7099-7107, suggests that at 30 mg/kg as single oral dose a concentration of 2 µM of the WNK1 inhibitor "Compound 12" some reduction in blood pressure was found in rodent hypertension models.

Chen et al., Oncotarget, (2018), 9(43), suggests WNK1 kinase could be a therapeutic target for glioblastoma with stem-like properties (i.e. cancer) and also mentions that several WNK1 mutations have been associated with cancer although their contribution to tumor initiation is unknown.

Zhang et. al. Acta Pharm. *Sinica* (2017), 39, discloses that WNK1 was activated by hypertonic stress in kidney epithelial cells, as well as breast and colon cancer cell lines.

Pio et al., PLOS ONE, (2017), discloses that knockdown of WNK1 resulted in a significant reduction of breast cancer cell migration in response to BMCM relative to a non-specific siRNA control.

Shyamasundar et al., Int. Jour. of Oncology (2016), 49, mentions that WNK1, one of the targets of miR-93, was verified as a putative target by the luciferase assay. D9 also show that siRNA-mediated silencing of WNK1, resulted in decreased invasive ability of these cells, suggesting that miR-93 mediated changes in cell invasion was possibly via WNK1.

Tsuboi et al., Official journal of the Int. Association of Pancreatology (2016), 16 (5), discloses the role of the guanine nucleotide exchange factor Vav3 in the motility and invasiveness of pancreatic ductal adenocarcinoma (PDAC) cells, and states that knockdown of WNK1 inhibited the motility and invasiveness in the motility and invasiveness of pancreatic ductal adenocarcinoma (PDAC) cells.

Hsu et al., Oncotarget (2016), 7(19), discloses that knockdown of WNK1 by siRNA transfection prevented cancer migration mediated by LCAF-CM and Kyn. These findings suggest that LCAF derived Kyn activates AKT, resulting in the triggering of WNK1-mediated cancer progression in lung cancer.

WNK1 (With-No-K(lysine)) and its downstream kinase targets oxidative-stress response 1 (OXSR1) and STE20/SPS1-related proline/alanine-rich kinase (SPAK) have well described roles in regulating the activity of Na/Cl transport in the kidney, where activated OXSR1/SPAK phosphorylates members of the SLC12 family of cation transporters. Inherited mutations found in the first coding exon of WNK1 and WNK4, which results in increased stabilization of the proteins, are linked to an inherited form of hypertension (Alessi et al., 2014; Rodan and Jenny, 2017). Because of the well described link to hypertension of the WNK kinases, there is an ongoing interest in developing inhibitors to the kinases of this pathway (AlAmri et al., 2017; Ishigami-Yuasa et al., 2017; Yamada et al., 2017; Yamada et al., 2016a; Yamada et al., 2016b).

Hence, in the literature, there has at present not been reported a specific role of the WNK kinases in blood cancers, such as leukemia and multiple myeloma.

SUMMARY OF THE INVENTION

The invention described herein covers existing small molecule inhibitors of WNK1 for use in treating patients with blood cancers, in particular leukemia and multiple myeloma. The inventors have demonstrated effects of inhibiting lysine deficient protein kinase 1 (WNK1) in leukemic cells in both tissue culture experiments in vitro as well as in a mouse model of leukemia in vivo. Moreover, the inventors have shown that a small molecule inhibitor to WNK1 are toxic for multiple myeloma cells.

Recently, several small molecule WNK1 inhibitors have been developed with the scope of using them to treat increased blood pressure. The inventors have shown that the WNK1 inhibitor 5-Chloro-2-(2-((methyl-d3)amino)thiazol-4-yl)-pyridin-4-yl)(4-(4-chlorobenzyl)piperazin-1-yl)methanone (a WNK1 inhibitor referred to as "Compound 12" in Yamada K, J Med Chem. 2017 Aug. 24; 60(16):7099-7107) can be repurposed, to be used in treatment of blood cancers.

Thus, an object of the present invention relates to the provision of a hitherto unknown therapeutic use of lysine deficient protein kinase 1 (WNK1) inhibitors, namely for use in treating patients with blood cancers, in particular acute myeloid leukemia and multiple myeloma.

Thus, one aspect of the invention relates to an inhibitor of lysine deficient protein kinase 1 (WNK1) for use in treatment of blood cancers in a mammalian subject.

Another embodiment of the invention relates to an inhibitor of lysine deficient protein kinase 1 (WNK1) for use in treatment of blood cancers in a mammalian subject, wherein the blood cancers are selected from the group consisting of (1) leukemia, including acute myeloid leukemia (AML), acute lymphoid leukemia (ALL), chronic myeloid leukemia (CML), chronic lymphocytic leukemia (CLL) or hairy cell leukemia (HCL), and (2) lymphoma, including diffuse large B-cell lymphoma (DLBCL), follicular lymphoma, small lymphocytic lymphoma (SLL), mantle cell lymphoma (MCL), marginal zone lymphomas, Burkitt lymphoma or lymphoplasmacytic lymphoma, and (3) myeloma, including multiple myeloma, light chain myeloma, non-secretory myeloma, solitary plasmacytoma, extramedullary plasmacytoma, monoclonal gammopathy of undetermined significance (MGUS), smoldering multiple myeloma (SMM), immunoglobulin D (IgD) myeloma or immunoglobulin E (IgE) myeloma.

Still another embodiments of the invention relates to an inhibitor of lysine deficient protein kinase 1 (WNK1) having a molecular weight less than 900 daltons for use in treatment of blood cancers in a human subject, wherein the blood cancers are selected from the group consisting of (1) leukemia, including acute myeloid leukemia (AML), acute lymphoid leukemia (ALL), chronic myeloid leukemia (CML), chronic lymphocytic leukemia (CLL) or hairy cell leukemia (HCL), and (2) lymphoma, including diffuse large B-cell lymphoma (DLBCL), follicular lymphoma, small lymphocytic lymphoma (SLL), mantle cell lymphoma (MCL), marginal zone lymphomas, Burkitt lymphoma or lymphoplasmacytic lymphoma, and (3) myeloma, including multiple myeloma, light chain myeloma, non-secretory myeloma, solitary plasmacytoma, extramedullary plasmacytoma, monoclonal gammopathy of undetermined significance (MGUS), smoldering multiple myeloma (SMM), immunoglobulin D (IgD) myeloma or immunoglobulin E (IgE) myeloma.

Still another embodiments of the invention relates to an inhibitor of lysine deficient protein kinase 1 (WNK1) having a molecular weight less than 900 daltons for use in treatment leukemia or multiple myeloma in a human subject.

Still another embodiments of the invention relates to an inhibitor of lysine deficient protein kinase 1 (WNK1) for use in treating blood cancers in a human subject, wherein the inhibitor are represented by the general formula

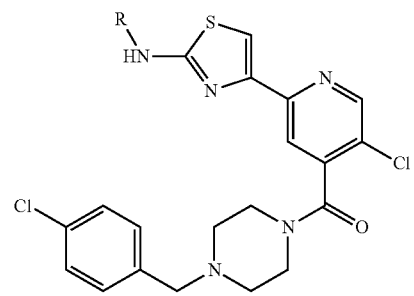

or a pharmaceutically acceptable salt thereof, wherein R is $CD_3$ or Me.

Still another embodiments of the invention relates to an inhibitor of lysine deficient protein kinase 1 (WNK1) for use in treating leukemia or multiple myeloma in a human subject, wherein the inhibitor are represented by the general formula

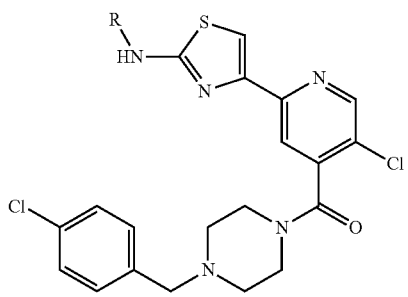

or a pharmaceutically acceptable salt thereof, wherein R is CD₃ or Me.

Still another embodiments of the invention relates to an inhibitor of lysine deficient protein kinase 1 (WNK1) for use in treating leukemia or multiple myeloma in a human subject, wherein the inhibitor are represented by the general formula

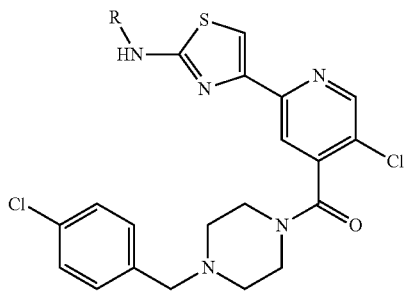

or a pharmaceutically acceptable salt thereof, wherein R is CD₃ or Me, wherein the inhibitor is formulated into a pharmaceutical composition, optionally comprising a pharmaceutically acceptable carrier.

A further embodiment of the invention relates to a method of treating blood cancers in a mammalian subject, including a human subject, by inhibiting lysine deficient protein kinase 1 (WNK1) in blood cancer cells, characterized in that a WNK1-inhibitor of the following general formula

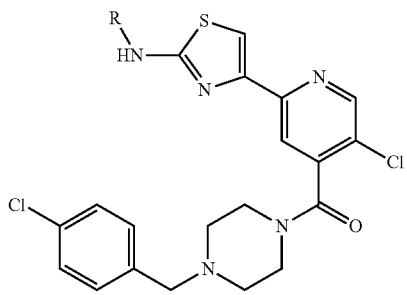

or a pharmaceutically acceptable salt thereof, wherein R is CD₃ or Me, is administered into the subject.

A still further embodiment of the invention relates to a method of treating blood cancers in a mammalian subject, including a human subject, by inhibiting lysine deficient protein kinase 1 (WNK1) in blood cancer cells, characterized in that a WNK1-inhibitor of the following general formula

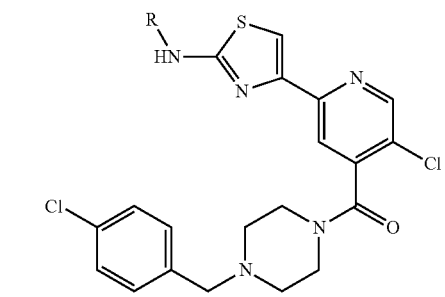

or a pharmaceutically acceptable salt thereof, wherein R is CD₃ or Me, is administered into the subject in the form of a pharmaceutical composition comprising a pharmaceutically acceptable carrier.

A still further embodiment of the invention relates to a method of treating leukemia or multiple myeloma in a human subject, by inhibiting lysine deficient protein kinase 1 (WNK1) in blood cancer cells, characterized in that a WNK1-inhibitor of the following general formula

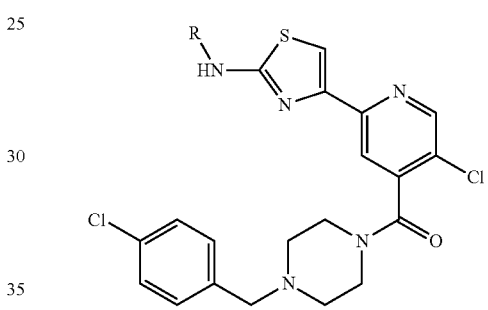

or a pharmaceutically acceptable salt thereof, wherein R is CD₃ or Me, is administered into the subject in the form of a pharmaceutical composition comprising a pharmaceutically acceptable carrier.

BRIEF DESCRIPTION OF THE FIGURES

FIG. 1 (A-D) shows that depletion of WNK1 protein (using three different gRNAs against WNK1: WNK1_6, WNK1_17, WNK1_1) negatively affects the growth of the cancer cell lines MA9, THP1 and MOLM13 but not MEFs. Cells were transduced with the indicated GFP tagged gRNA expressing lentiviruses (WNK1_6, WNK1_17, WNK1_1, RPS19 and Nctrl). The fraction of gRNA expressing cells relative to day 2 after transduction was measured by FACS. RPS19 expresses a gRNA against an essential gene and functions as a positive control Nctrl as negative control.

FIG. 2 (A-B) shows that the catalytic activity of WNK1 is required for the growth of MA9 cells.

R26creERT2+ refers to the genotype of the knockout mouse strain, Wnk1$^{fD368A}$;R26creERT2+ refers to the genotype of the catalytic mutant mouse strain

FIG. 4 shows that "Compound 12" inhibits growth of MA9 cells.

FIG. 5 shows dose response curves to "Compound 12" in the indicated human cell lines. IC50 values were calculated using the Prism software. BJ tert refers to a diploid human fibroblast cell line, U2OS refers to a human osteosarcoma cell line, MOLM13 refers to a human acute myeloid leukemia cell line, THP1 refers to a human monocytic leukemia cell line, Monomac refers to a human monocytic leukemia cell line, MMS1 refers to a human multiple myeloma cell line, KMS18 refers to a human multiple myeloma cell line, KSM11 refers to a human multiple myeloma cell line, MsTo refers to a human mesothelioma cell line, H226 refers to a human lung carcinoma cell line.

The present invention will now be described in more detail in the following.

DETAILED DESCRIPTION OF THE INVENTION

The inventors performed a CRISPR/Cas9 screen in mouse leukemia cells and identified the WNK1 kinase as a potential therapeutic target in leukemia. Using mouse cells with conditional knockout of Wnk1 as well as applying CRISPR/Cas9 technology, the inventors have confirmed the initial screening hit both in vitro and in vivo.

Importantly, the inventors have shown that the catalytic activity of WNK1 is required for WNK1 function in leukemic cells making WNK1 inhibition a feasible therapeutic strategy in leukemia.

WNK1 Kinase Pathway Essential for MLL-AF9 Translocated Acute Myeloid Leukemia (AML) Cells With the aim of identifying novel therapeutic targets in acute myeloid leukemia (AML) cells, the inventors have screened a kinome-wide CRISPR/Cas9 library in cells derived from a mouse leukemia model, in which the transforming event is the expression of MLL-AF9 (MA9). The library consisted of around 6000 gRNAs targeting a total of 545 kinases with 5-10 different gRNAs per gene as well as positive and negative controls. The screen was a dropout screen, where cells grew for 10 doublings after transduction of the library. The gRNAs present in the start and at the end of the experiment were determined by NGS (Illumina) sequencing. Analyses of the screening results demonstrated that a number of different kinases are required for the growth of MA9 cells; many of these have previously been found essential for AML cells. One kinase that stands out as of particular interest is the WNK1 kinase.

Validation of Screen Hits

To validate the hits from the screen the inventors cloned individual gRNAs against mouse and human WNK1 and tested their phenotype in GFP depletion assays. To test if WNK1 was essential for all cell types the inventors also transduced p53 knockout MEFs. From these data the inventors concluded that AML cells are more sensitive to WNK1 depletion than control MEFs (FIG. 1A-D).

The Catalytic Activity of WNK1 is Required for the Growth of MA9 Cells

Figure 1A:
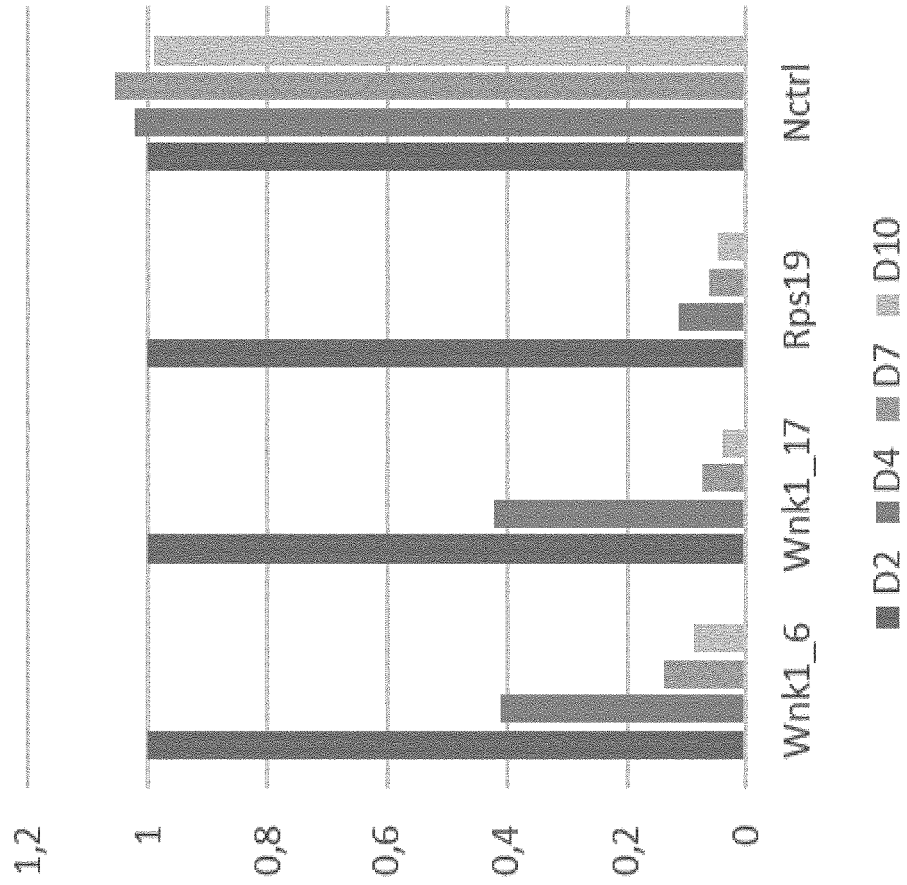
FIG. 1A: MA9 (mouse MLL-AF9 driven acute myeloid leukemia cell line).
Figure 1B:
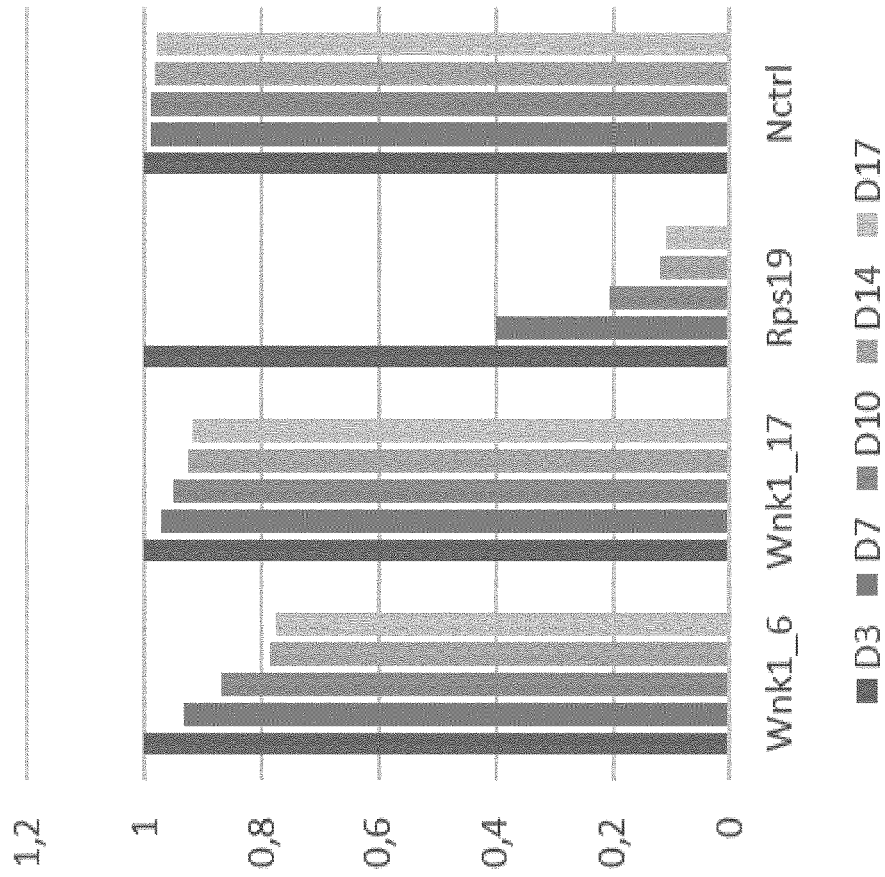
FIG. 1B: MEF (p53 knockout mouse embryonic fibroblasts).
Figure 1C:
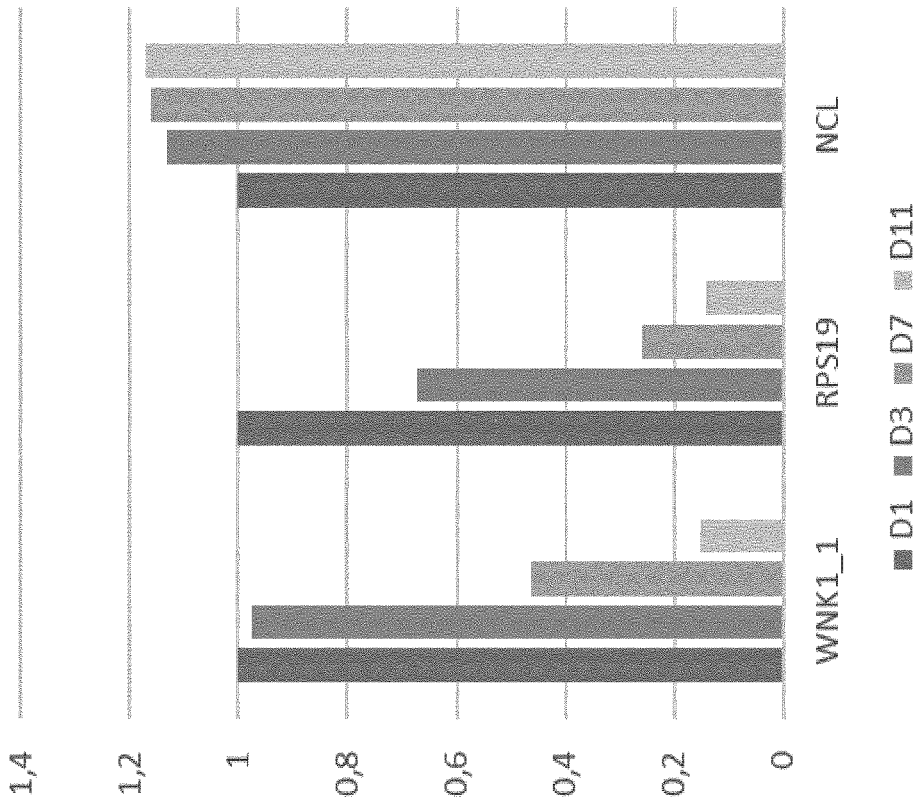
FIG. 1C and FIG. 1D: THP1 and MOLM13 (two different human acute myeloid leukemia cell lines). Nctrl and NCL are negative controls. The indications on the Y-axis of FIGS. 1A-D represent % of GFP positive cells. D1, D2 . . . D17 represent days elapsed since transduction with lentivirus.
Figure 1D:
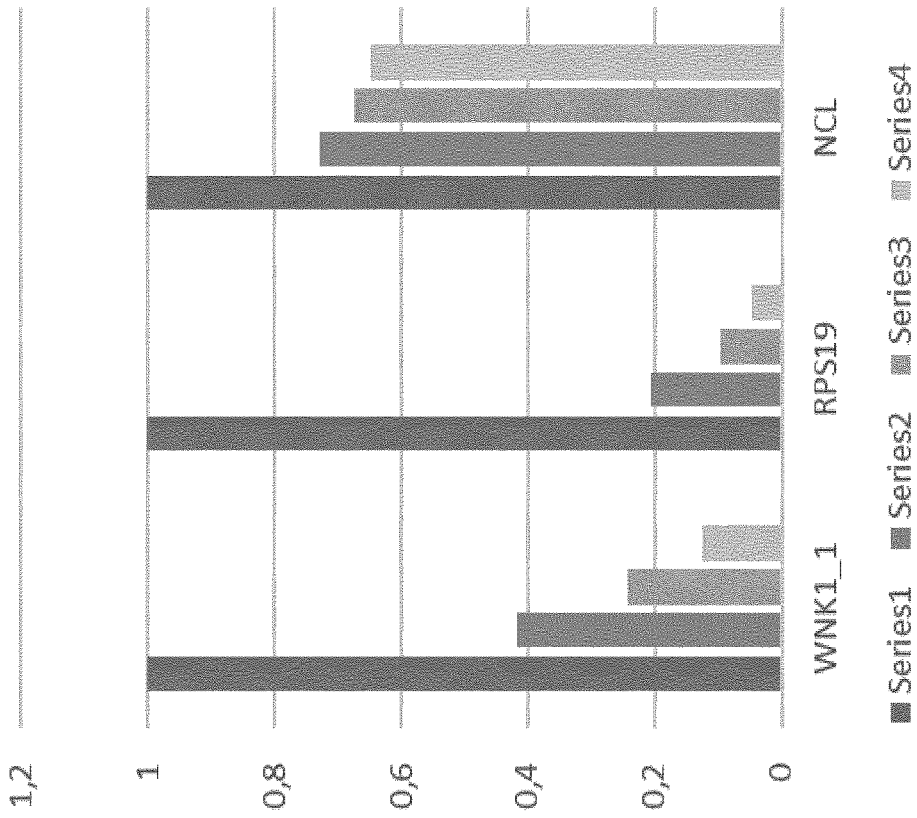
Figure 2A:
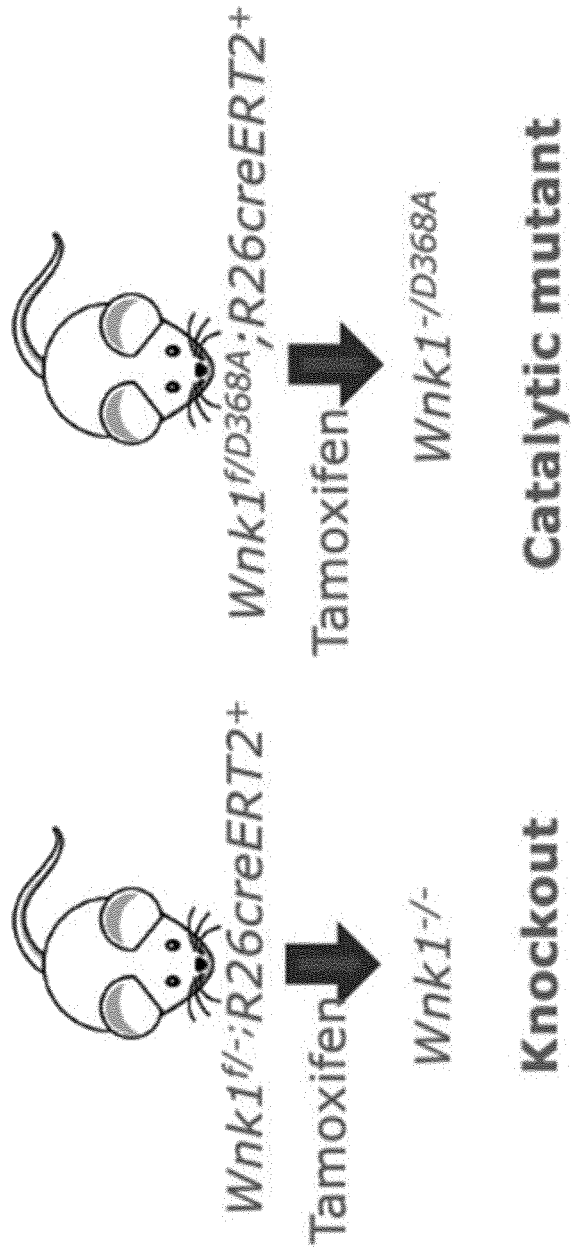
FIG. 2A is showing a schematic drawing of the combination of Wnk1 alleles in the WNK1 compound mice and the result of induction of recombination by injection of tamoxifen. Wnk1$^{f/-}$.
Figure 2B:
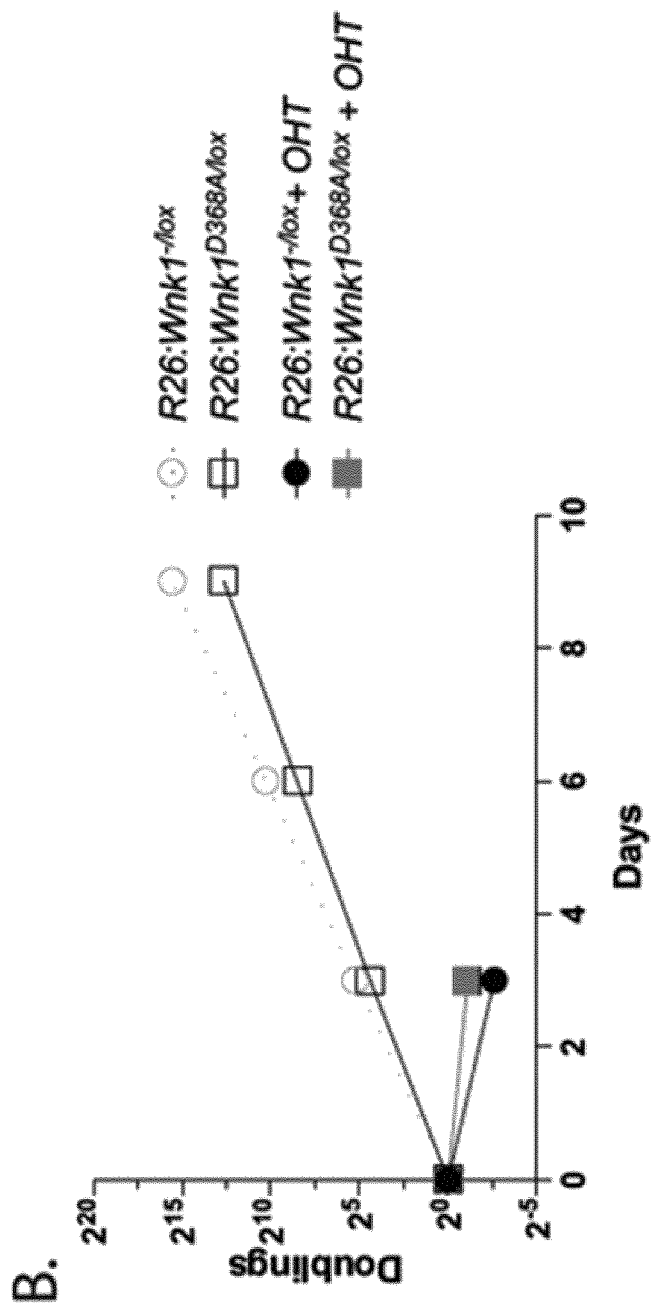
FIG. 2B is showing growth curves in liquid culture of leukemic cells derived from WNK1 compound mice with the indicated genotypes. The Y-axis (doublings) represents the number of doublings of the cell number in the culture, Wnk1$^{D368A}$ represents mice expressing a catalytic dead WNK1 mutant (R26:Wnk1$^{-/lox}$ refers to cells with a conditionally allele of Wnk1 before induction of knockout, R26:Wnk1$^{D368A/lox}$ refers to cells with a conditionally knockin of the WNK1 catalytic mutant before induction of knockin, R26:Wnk1$^{-/lox}$+OHT refers to cells with the knockout of Wnk1 after treatment with OHT, R26:Wnk1$^{D368A/lox}$+OHT refers to cells only expressing the Wnk1 catalytic mutant after treatment with OHT.

To investigate if the catalytic activity of WNK1 is required for the growth of MA9 cells the inventors obtained compound heterozygous mice with both a loxP-flanked allele of Wnk1$^{flox}$ and a kinase-inactive allele of Wnk1$^{D368A}$ as well as tamoxifen-inducible Cre; Rosa26-CreERT2 (Wnk1$^{lox/D368A}$;R26creERT2). Treatment of such mice with tamoxifen results in MA9 cells that express only catalytic mutant of WNK1 (WNK1D368A) (FIG. 2A left). To measure the effect of complete deletion of WNK1, the inventors used Wnk1$^{flox/-}$ Rosa26creeERT2 mice, in which tamoxifen injection leads to deletion of the conditional allele of Wnk1, leaving a null allele (FIG. 2A right) and as a control the inventors used Wnk1$^{flox/+}$Rosa26creeERT2 mice, in which tamoxifen injection leads to the expression of one functional allele of Wnk1. The inventors transduced c-Kit enriched bone marrow cells isolated from these mice with an MLL-AF9 expressing retroviral vector and used these in transplantation experiments to generate MA9 cells with the three different Wnk1 genotypes; MA9(Wnk1$^{flox/D368A}$; R26creERT2), MA9(Wnk1$^{flox/-}$Rosa26creeERT2) and MA9 (Wnk1$^{flox/+}$Rosa26creeERT2). Using these cells in in vitro growth assays the inventors demonstrated that Wnk1 deletion resulted in a strong attenuation of growth and that the expression of the catalytic mutant, alone, had a similar effect (FIG. 2B). These results demonstrate that WNK1 kinase activity is required for the growth of MA9 cells.

Figure 3A:
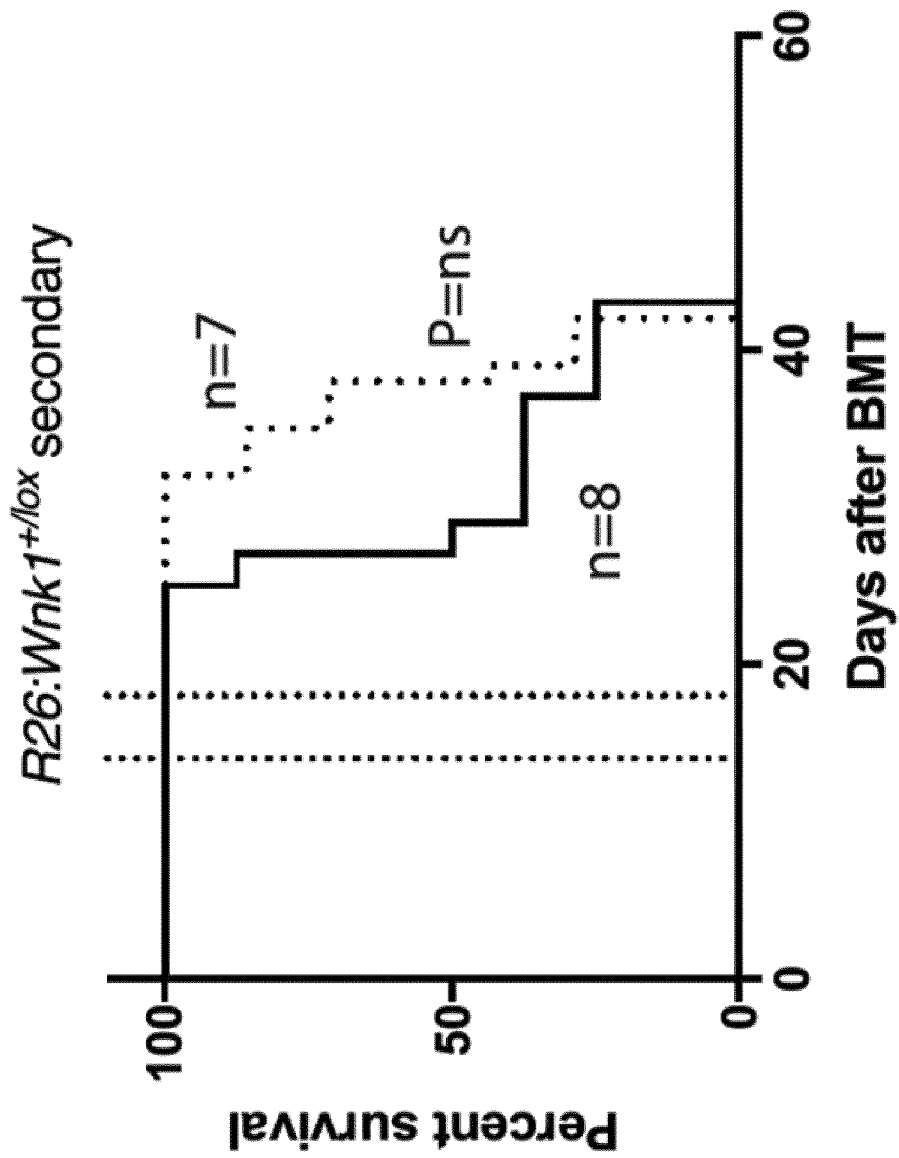
FIG. 3 shows that WNK1 kinase activity is required for MLL-AF9-driven leukemia in vivo, ("MLL-AF9" being a leukemia oncogene). MLL-AF9 driven leukemia was induced in Rosa26CreERT2: Wnk1$^{+/lox}$ and Rosa26CreERT2: Wnk1$^{D368A/lox}$ mice. Cells from leukemic mice was used in transplantations to generate secondary leukemias (more aggressive). When the leukemia became detectable the mice were injected with tamoxifen (indicated with vertical dotted line) to induce the knockout of the floxed allele. Wnk1+/− control (FIG. 3A), or Wnk1D368/− kinase dead (FIG. 3B). Significance is the result of a Log-rank (Mantel-Cox) test. BMT refers to bone marrow transplantation with leukemic cells to induce leukemia.
Figure 3B:
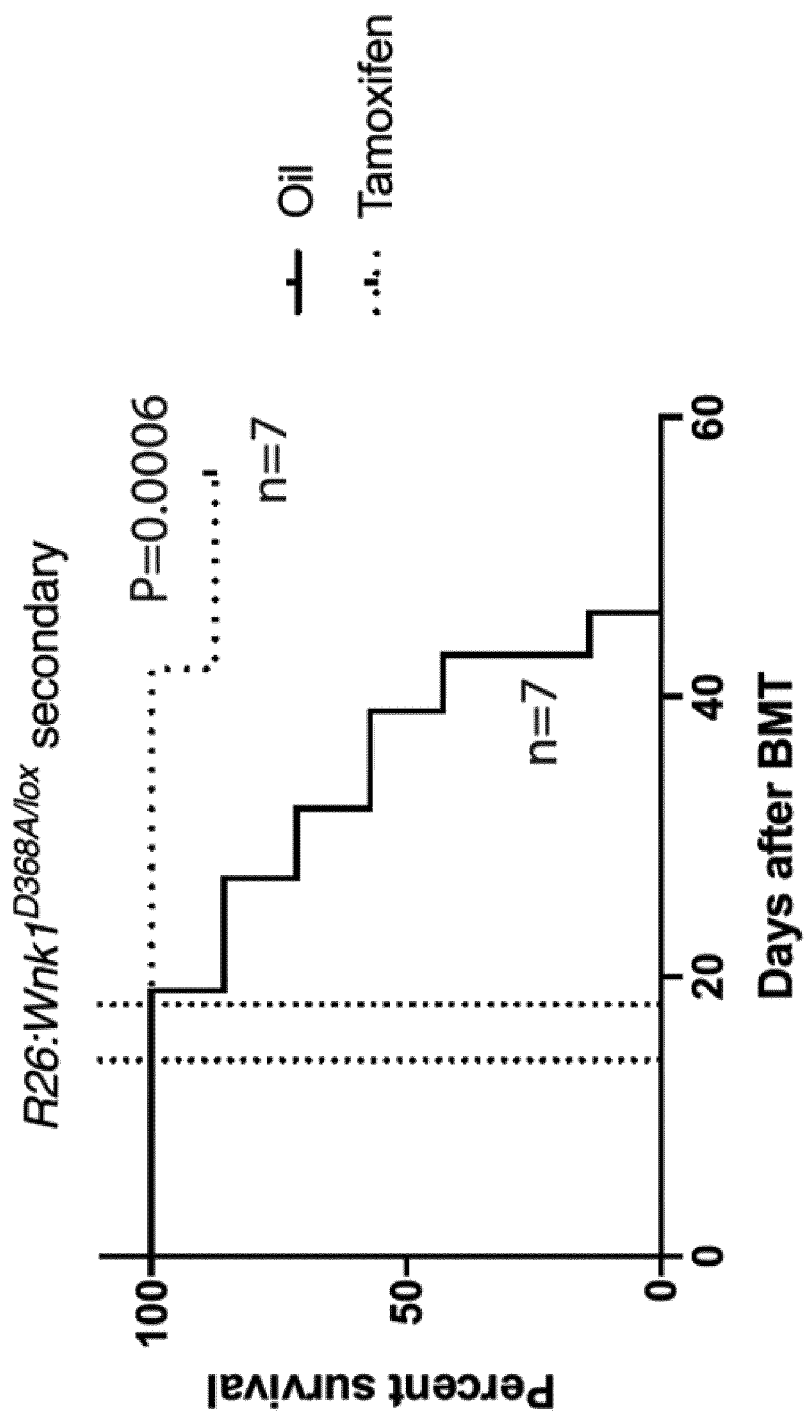

WNK1 Kinase Activity is Required for the Maintenance of Acute Myeloid Leukemia (AML) In Vivo To investigate if the WNK1 kinase activity is also required for the growth of MA9 cells in vivo, the inventors transplanted mice with MA9(Wnk1$^{fox/D368A}$;R26creERT2)

or control cells MA9(Wnk1$^{flox/+}$Rosa26creeERT2). When the secondary leukemia started to develop, the inventors injected the mice with tamoxifen to delete the floxed Wnk1 allele, resulting in cells expressing one allele of WNK1 (control cells) or in cells only expressing a kinase inactive mutant of WNK1D368A. It is evident that injection of tamoxifen to induce recombination of MA9(Wnk1$^{flox/D368A}$; R26creERT2) and expression of only catalytic WNK1 mutant results in a significant increase of the lifespan of the mice (FIG. 3B) whereas induction of the control allele MA9(Wnk1$^{flox/+}$Rosa26creeERT2) leaving one functional allele of Wnk1 has no significant effect on the lifespan of the mice (FIG. 3A).

Figure 4A:
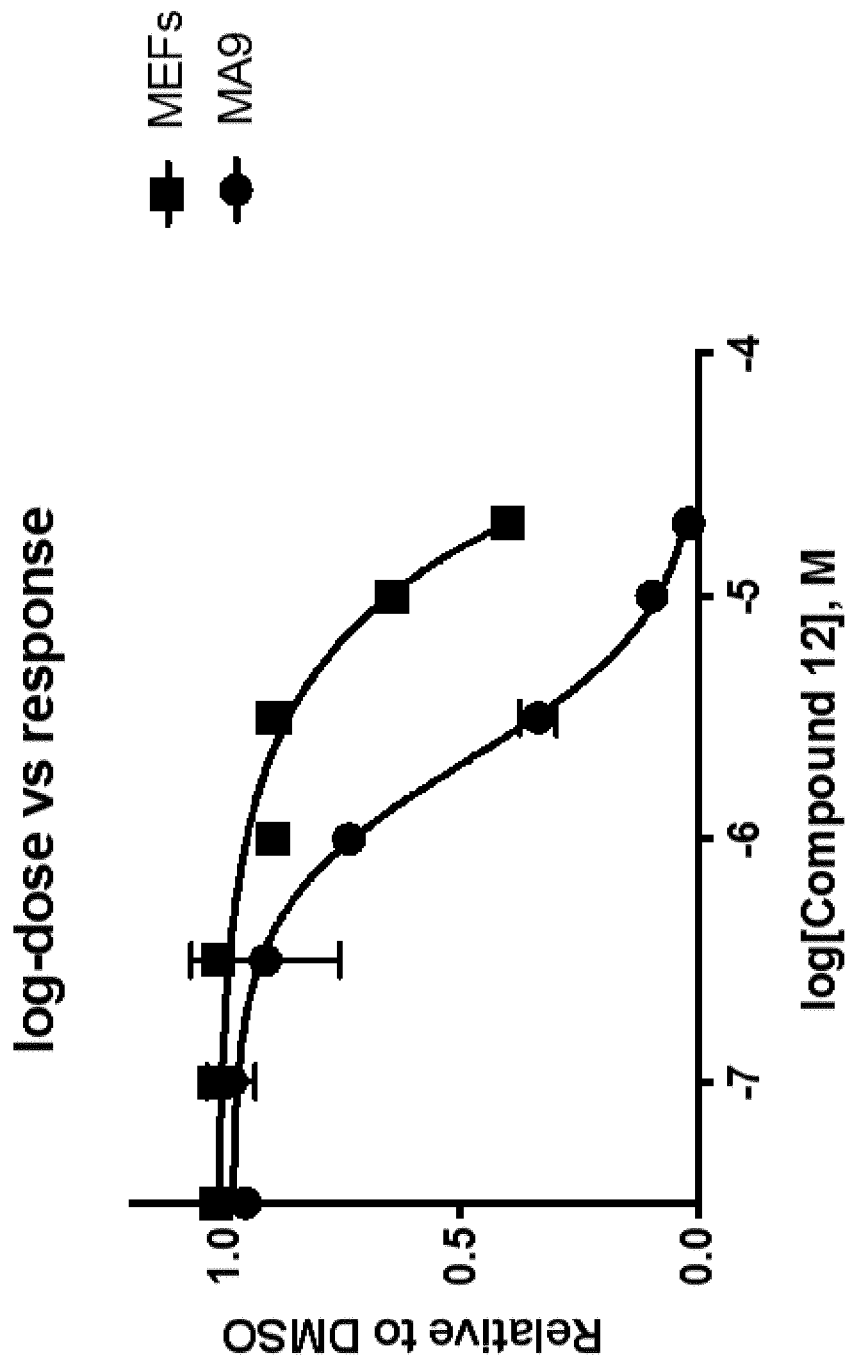
FIG. 4A: Dose response curves generated using either MEFs or MA9 cells with increasing amounts of "Compound 12" dissolved in DMSO.
Figure 4B:
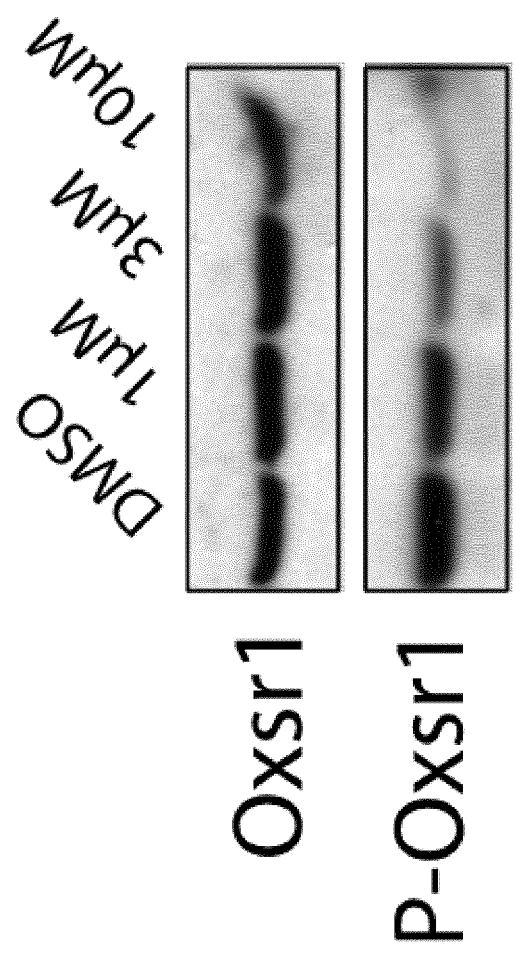
FIG. 4B: Western blot (WB) using lysates from MA9 cells treated for 3 hours with the indicated concentrations of "Compound 12". The blots were probed with an antibody against OXSR1 or an antibody against the phosphorylated form of OXSR1 (P-OXSR1). The WB with a phospho-specific antibody against the phosphorylated form of OXSR1 documents that "Compound 12" inhibits WNK1 in leukemic cells and that the degree of inhibition correlate with the effect on growth.
Figure 4C:
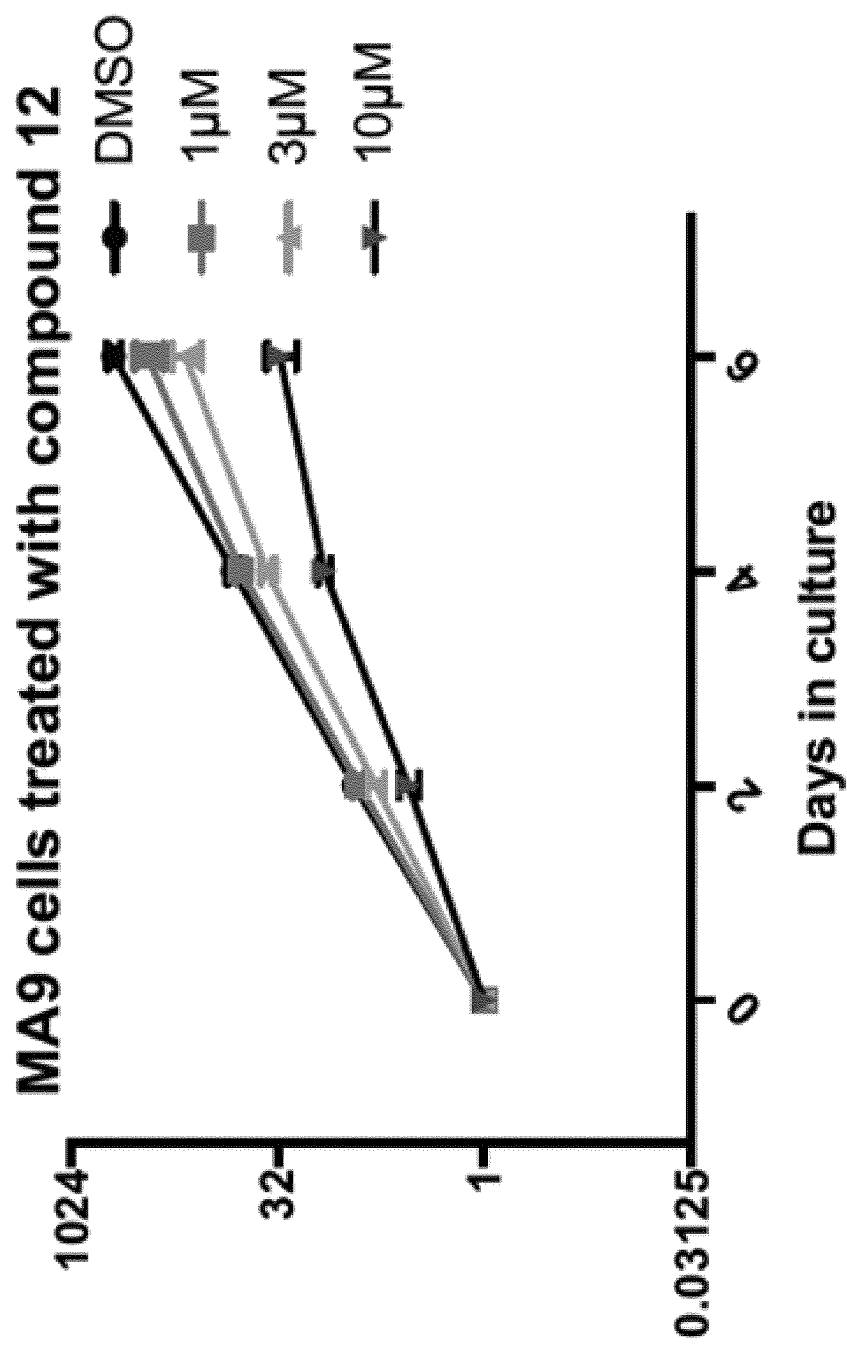
FIG. 4C: Growth curve of MA9 cells grown in different concentrations of "Compound 12". Cells were counted and replated every 2 days.
Figure 5:
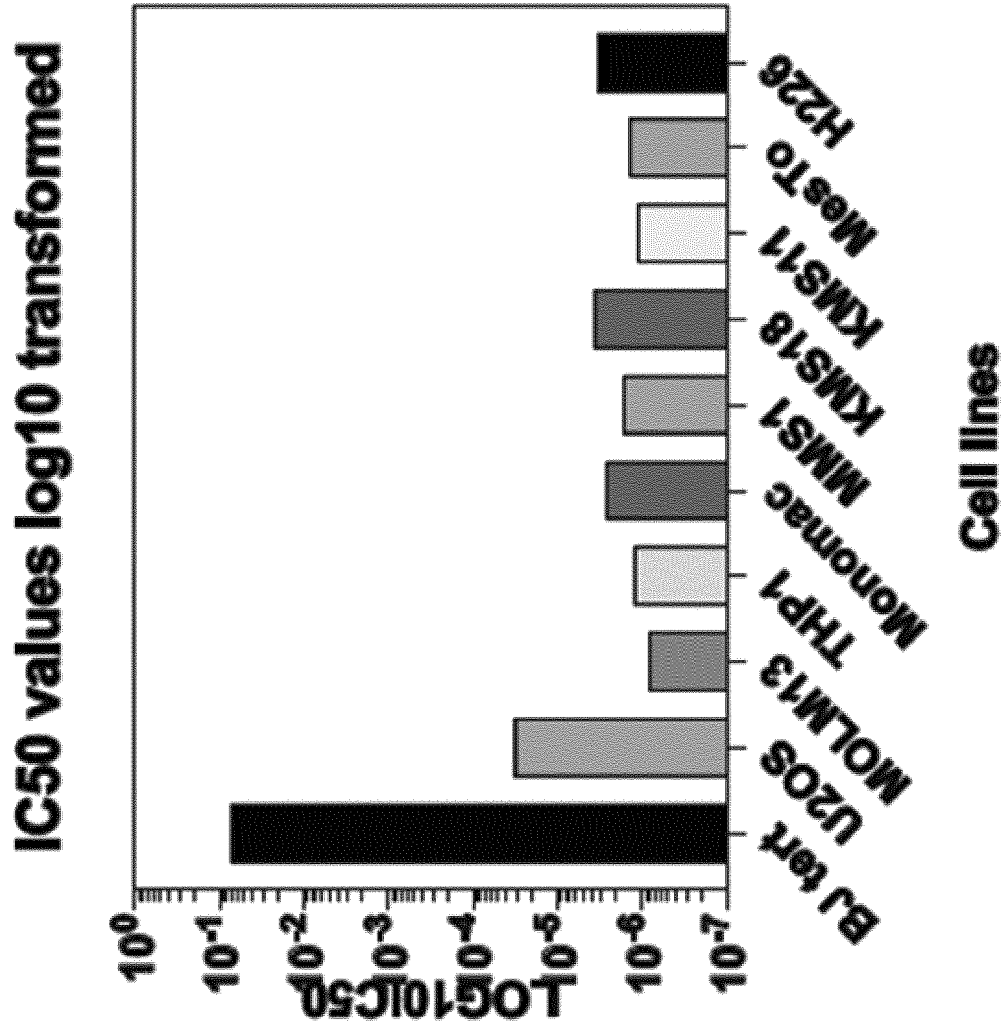
FIG. 5 shows that human blood cancer cell lines are more sensitive to "Compound 12" than human diploid fibroblasts.

(5-Chloro-2-(2-((methyl-d3)amino)thiazol-4-yl)-pyridin-4-yl)(4-(4-chlorobenzyl)piperazin-1-yl) methanone, "Compound 12", WNK1 Inhibitor Several different WNK inhibitors of varying efficiency and specificity have been described in the literature. One of these are (5-Chloro-2-(2-((methyl-d3)amino)thiazol-4-yl)-pyridin-4-yl)(4-(4-chlorobenzyl)piperazin-1-yl)methanone, named "Compound 12" in Yamada et al., 2017, having an IC50 of 6 nM and an EC50 for phosphorylated OXSR1 of 0.59 µM in cells (Yamada et al, 2017). The inventors had "Compound 12" synthesized according to the below synthesis of "Yamada K, J Med Chem. 2017 Aug. 24; 60(16): 7099-7107" and tested it in viability assays on MA9 cells and MEFs in vitro. IC50 in MA9 cells is around 1 µM and significantly higher in MEFs (FIG. 4A). Western blot (WB) experiments with phosphor-Oxsr1 antibody and growth curves of MA9 cells supports the notion that "Compound 12" mediated inhibition of WNK1 results in attenuated growth of MA9 cells (FIG. 4B-C). To extend the data to human cell lines the inventors performed viability assays on 10 different human cell lines. Most of the blood cancer cell lines had an IC50 of around 1 µM and they were significantly more sensitive to WNK1 inhibition than diploid fibroblasts (FIG. 5).

Synthesis of "Compound 12"

The below-described synthesis of "Compound 12" is disclosed in "Yamada K, J Med Chem. 2017 Aug. 24; 60(16):7099-7107": To a solution of (4-(4-chlorobenzyl) piperazin-1-yl)(2,5-dichloropyridin-4-yl)methanone (550 mg, 1.43 mmol) and tributyl(1-ethoxyvinyl)tin (0.5 mL, 1.487 mmol) in 1,4-dioxane (20 mL) was added Pd(PPh3)4 (70 mg, 0.061 mmol), and the mixture was stirred at 100° C. for 7 h. After letting it cool to room temperature, the reaction mixture was added into 2 M aqueous potassium fluoride solution (5 mL). To this reaction mixture was added N-bromosuccucinimide (300 mg, 1.69 mmol) in one portion. This reaction mixture was stirred for 30 min at room temperature. Insoluble material was removed via filtration, rinsing with methanol (3×20 mL). The resulting filtrate was cooled to 0° C. into which a solution of N-Boc-thiourea (400 mg, 2.27 mmol) was added. This reaction mixture was stirred for 2 h, letting warm it to room temperature. After removal of solvent, the resulting crude material was dissolved in dichloromethane and washed with 1 N aqueous NaOH solution and brine. The organic layer was dried over $Na_2SO_4$, filtered, and concentrated under reduced pressure. The residue was purified by silica gel column chromatography (heptane/ethyl acetate) to give tert-butyl (4-(5-chloro-6-(4-(4-chlorobenzyl)piperazine-1-carbonyl)pyridin-2-yl)-thiazol-2-yl)carbamate (550 mg, 70%). $^1$H NMR (400 MHz, CDCl3) δ ppm 1.58 (s, 9H), 2.40-2.46 (m, 2H), 2.56 (br s, 2H), 3.26-3.31 (m, 2H), 3.52 (s, 2H), 3.82-3.88 (m, 2H), 7.26-7.32 (m, 4H), 7.66 (s, 1H), 7.85 (s, 1H), 7.99 (br s, 1H), 8.59 (s, 1H). ESI-MS m/z: 548.0 [M+H]$^+$.

To a suspension of tert-butyl (4-(5-chloro-6-(4-(4-chlorobenzyl)piperazine-1-carbonyl)pyridin-2-yl)thiazol-2-yl) carbamate (530 mg, 0.966 mmol) and potassium carbonate (340 mg, 2.46 mmol) in DMF (15 mL) was added $CD_3I$ (161 mg, 1.11 mmol) dropwise at 0° C., and the mixture was stirred for 2 h letting warm to room temperature. After removal of the solvent under reduced pressure, the resulting material was suspended in water (50 mL) and stirred for 30 min at room temperature to form a brown precipitate. The resulting precipitate was collected via filtration and rinsed with cold water and hexane to give tert-butyl (4-(5-chloro-4-(4-(4-chlorobenzyl)piperazine-1-carbonyl)pyridin-2-yl) thiazol-2-yl)(methyld3) carbamate (430 mg, 79%). $^1$H NMR (400 MHz, CDCl$_3$) δ ppm 1.53 (s, 9H), 2.32-2.38 (m, 2H), 2.48 (br s, 2H), 3.18-3.27 (m, 2H), 3.43 (s, 2H), 3.70-3.72 (m, 1H), 3.82-3.86 (m, 1H), 7.17-7.23 (m, 4H), 7.64 (s, 1H), 7.92 (s, 1H), 8.49 (s, 1H). ESI-MS m/z: 565.4 [M+H]$^+$. To a suspension of tert-butyl (4-(5-chloro-4-(4-(4-chlorobenzyl)-piperazine-1-carbonyl)pyridin-2-yl)thiazol-2-yl) (methyl-d$_3$)carbamate (50 mg, 0.088 mmol) in methanol (6 mL) was added 3 M aqueous HCl solution (0.3 mL, 0.90 mmol), and the mixture was stirred for 2 h at 60° C. The mixture was cooled, and the solvent evaporated under reduced pressure gave "Compound 12": (5-chloro-2-(2-((methyl-d$_3$)-amino)thiazol-4-yl)pyridin-4-yl)(4-(4-chlorobenzyl)piperazin-1-yl)-methanone hydrochloride (41 mg, 86%). $^1$HNMR (400 MHz, DMSO-d$_6$) δ ppm 3.04 (brs, 2H), 3.20 (brs, 1H), 3.29-3.42 (m, 3H), 3.52-3.62 (m, 2H), 4.35-4.40 (m, 2H), 4.59 (brs, 1H), 7.44 (brs, 1H), 7.54-7.55 (m, 2H), 7.63 (brs, 2H), 7.92-7.97 (m, 1H), 8.70 (s, 1H), 11.45 (brs, 0.5H), 11.58 (brs, 0.5H). $^{13}$CNMR (100 MHz, DMSO-d6) δ ppm 169.59, 163.73, 158.30, 158.05, 150.89, 148.86, 147.05, 142.48, 134.38, 133.29, 128.73, 124.91, 118.56, 116.16, 114.24, 106.65, 57.75, 50.58, 50.07, 49.93, 42.88, 42.34, 37.76, 30.71. HRMS (TOF) calcd. for $C_{21}H_{25}Cl_2N_5OS$ [M+H]+ 465.1156, found 465.1110.

In Vivo Treatment of Leukemic Mice with "Compound 12" Increase their Lifespan

"Compound 12" has low toxicity in mice (Yamada et al., 2017). To test the in vivo efficacy in mouse model of MLL-AF9 translocated leukemia the inventors injected "Compound 12" into mice 4 days after they had been transplanted with leukemic cells. As can be seen (FIG. 6A) continuous injection of "Compound 12" results in increased lifespan of the mice.

To summarize the inventors have found the kinase WNK1 to be required for the growth of MLL-AF9 translocated acute myeloid leukemia (AML) cells. The inventors have shown that the catalytic activity of WNK1 is critical for the survival of leukemic cells both in vitro and in vivo. In addition, the inventors see that the MA9 cells as well, as other blood cancer cell lines, are sensitive to WNK1 inhibition. Importantly, the inventors demonstrated that treatment of a leukemia mouse model with"Compound 12" resulted in increased lifespan of the treated mice.

Definitions

Prior to discussing the present invention in further details, the following terms and conventions will first be defined:

AML: when used herein, AML refers to acute myeloid leukemia.

BJ tert: when used herein, BJ tert refers to a diploid human diploid fibroblast cell line, immortalized by the expression of Telomerase (tert).

Blood cancers: when used herein, blood cancers refer to the three main types of blood cancer, i.e. leukemia, lymphoma and myeloma where (1) Leukemia is a blood cancer that originates in the blood and bone marrow. It occurs when the body creates too many abnormal white blood cells and interferes with the bone marrow's ability to make red blood cells and platelets, and (2) Non-Hodgkin lymphoma is a blood cancer that develops in the lymphatic system from cells called lymphocytes, a type of white blood cell that helps the body fight infections. Hodgkin lymphoma is a blood cancer that develops in the lymphatic system from cells called lymphocytes. Hodgkin lymphoma is characterized by the presence of an abnormal lymphocyte called the Reed-Sternberg cell, and (3) Multiple myeloma is a blood cancer that begins in the blood's plasma cells, a type of white blood cell made in the bone marrow.

"Compound 11": when used herein, "Compound 11" refers to the WNK1-inhibitor with the IUPAC name (5-Chloro-2-(2-(methylamino)thiazol-4-yl)-pyridin-4-yl)(4-(4-chlorobenzyl)piperazin-1-yl)methanone)), as described on e.g. page 7102 in Yamada K, J Med Chem. 2017 Aug. 24; 60(16):7099-7107), i.e. having the molecular formula

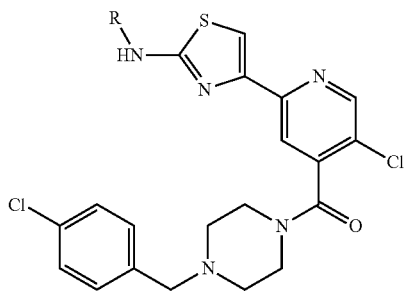

wherein R is Me.

"Compound 12": when used herein, "Compound 12" refers to the WNK1-inhibitor with the IUPAC name (5-Chloro-2-(2-((methyl-d$_3$)amino)thiazol-4-yl)-pyridin-4-yl)(4-(4-chlorobenzyl)piperazin-1-yl)methanone) as described on e.g. page 7102 in Yamada K, J Med Chem. 2017 Aug. 24; 60(16):7099-7107), i.e. having the molecular formula

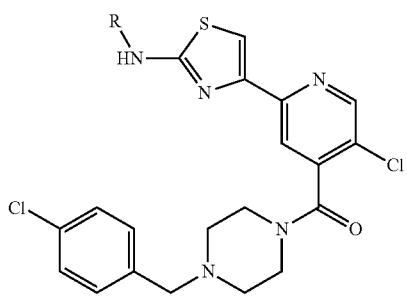

wherein R is CD$_3$.

CRISPR: when used herein, CRISPR refers to systems contain two components: a guide RNA (gRNA) and a CRISPR-associated endonuclease (Cas protein (when used herein: Cas 9)). The gRNA is a short synthetic RNA composed of a scaffold sequence necessary for Cas-binding and a user-defined ~20 nucleotide spacer that defines the genomic target to be modified.

DMSO: when used herein, DMSO refers to dimethyl sulfoxide, being an organosulfur compound with the formula (CH$_3$)$_2$SO. This colourless liquid is a polar aprotic solvent that dissolves both polar and nonpolar compounds and is miscible in a wide range of organic solvents as well as water.

FACS: when used herein, FACS refers to or fluorescence-activated cell sorter.

GFP: when used herein, GFP refers to green fluorescent protein.

Floxed allele: when used herein, floxed allele refers to the sandwiching of a DNA sequence (allele), which is then said to be floxed, between two lox P sites. Floxing a gene allows it to be deleted (knocked out), translocated or inverted.

H226: when used herein, H226 refers to a human lung carcinoma cell line.

Kinome: when used herein, kinome of an organism refers to the complete set of protein kinases encoded in its genome.

KMS11: when used herein, KMS11 refers to human multiple myeloma cell line, i.e. a cancer cell line.

KMS18: when used herein, KMS18 refers to human multiple myeloma cell line, i.e. a cancer cell line.

MA9: when used herein, MA9 refers to mouse/murine MLL-AF9 (leukemia oncogene) driven acute myeloid leukemia cell line.

MEF: when used herein, MEF refers to p53 knockout mouse embryonic fibroblasts (p53: tumor protein (TRP53), is any isoform of a protein encoded by homologous genes in various organisms, such as TP53 (humans) and Trp53 (mice)).

MsTo: when used herein, MsTo refers to human mesothelioma cell line.

MLL-AF9: when used herein, MLL-AF9 refers to a leukemia oncogene mainly associated with monocytic acute myeloid leukemia.

MMS1 (or MMS-1): when used herein, MMS1 refers to human multiple myeloma cell line.

MOLM13: when used herein, MOLM13 refers to a human acute myeloid leukemia cell line.

Monomac: when used herein, monomac refers to a human monocytic leukemia cell line.

NGS (Illumina) sequencing: when used herein, NGS (Illumina) sequencing refers to next-generation sequencing (NGS) by the Illumina sequencer, model NextSea500.

OXSR1: when used herein, OXSR1 refers to serine/threonine-protein kinase OXSR1, an enzyme that in humans is encoded by the OXSR1 gene. The product of this gene belongs to the Ser/Thr protein kinase family.

sgRNA: when used herein, sgRNA is a short synthetic RNA composed of a scaffold sequence necessary for Cas-binding and a user-defined ~20 nucleotide spacer that defines the genomic target to be modified.

Small molecule: when used herein, small molecule, such as small molecule WNK1 inhibitors, refers to a molecule having a molecular weight below 900 daltons.

Tamoxifen: when used herein, tamoxifen is e.g. used to induce activity of a modified version of the Cre recombinase (CreERT2) to delete the floxed Wnk1 allele in vivo.

THP1: when used herein, THP1 refers to a human monocytic cell line derived from an acute monocytic leukemia human patient.

WNK1: when used herein, WNK1 refers to lysine deficient protein kinase 1, being an enzyme that is encoded by the WNK1 gene. WNK1, being a protein is composed of 2382 amino acids (molecular weight 230 kDa), is serine-threonine kinase and part of the "with no lysine/K" kinase WNK family.

WNK1 inhibitors: when used herein, "WNK1 inhibitors" (or similar expressions) refers to small chemical compounds (molecular weight below 900 daltons) that can inhibit the catalytic activity of WNK1.

Wnk1$^{D368A}$: when used herein, Wnk1$^{D368A}$ refers to a catalytic dead WNK1 mutant (or mice expressing the catalytic dead WNK1 mutant).

Wnk1$^{flox}$: when used herein, Wnk1$^{flox}$ refers to a conditionally Wnk1 knockout (or mice in which the Wnk1 gene was conditionally knockout).

U2OS: when used herein, U2OS refers to a human osteosarcoma cell line, i.e. a cancer cell line.

293FT cell: when used herein, 293FT cell (or cell line) refers to a fast-growing, highly transfectable clonal isolate derived from human embryonal kidney cells transformed with the SV40 large T antigen.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1: Cloning gRNA sgRNA sequences were designed using the sgRNA design tool (http://portals.broadcastinstitute.org/gpp/public/analysis-tools/sgrna-design). Oligonucleotides were synthesized and cloned into the lentiviral expression vector (pL-CRISPR-SFFV-Puro-P2A-EGFP) using standard protocols.

sgRNA oligonucleotides used in this study were:

```
(Wnk1_6):
                          SEQ ID NO 1
TGGTCTGGCAACTCTAAAGC (Wnk1_17):
                          SEQ ID NO 2
TCTGGACACCGAAACCACTG (Rps19):
                          SED ID NO 3
ATTCTCTTGGTTCTAGGTCC (Nctrl):
                          SEQ ID NO: 4
GACGTCTAATTTCTGGCCGT (WNK1_1):
                          SEQ ID NO 5
GCCGTGGGAATGTCTAACGA (RPS19):
                          SEQ ID NO 6
CGAATGGGTGGATACCGTCA (NCL):
                          SEQ ID NO 7
CCCGCATGACACCGTCACTT
```

Example 2: Growth of Murine and Human Cell Lines

THP1 and MOLM13 cells were grown in RPMI growth medium (Gibco, ThermoFisher: 61870-0100) containing 10% Fetal Bovine Serum, FBS (HyClone: SV30160.03) and penicillin/streptomycin (Gibco, ThermoFisher: 15140-122). Murine MLL-AF9 transformed leukemic cell lines were grown in RPMI, 20% FBS (HyClone: SV30160.03) and 10 ng/mL of murine IL3 (Reprotech 213-13). Mouse embryonic fibroblasts were grown in DMEM growth medium (Gibco, ThermoFisher: 31966-021), 10% FBS (HyClone: SV30160.03) and penicillin/streptomycin (Gibco, ThermoFisher: 15140-122).

Example 3: Generation of MLL-AF9 Transformed Murine Wnk1 Knockout/in Cell Lines CD117 (c-Kit) expressing cells were enriched from the bone marrow of R26CreERT2: Wnk1$^{D368A/lox}$, R26CreERT2: Wnk1$^{+/lox}$ and R26CreERT2: Wnk1$^{-/lox}$ using magnetic beads coupled with CD117 antibody (CD117 Microbeads, mouse. Miltenye Biotec: 130-091-224) using MACS columns (Miltenye Biotec: 130-042-401). The c-kit positive cells were transduced with a retrovirus expressing the MLL-AF9 fusion (MSCV-MLL-AF9 (Muntean et al., 2010)).

Transduced cells were plated into methyl cellulose media (M3534. STEMCELL Technologies: 03534). Following 2 rounds of replating, 1×10$^6$ cells were transplanted into lethally irradiated (950 cGY) B6.SJL mice together with 2×10$^5$ whole bone marrow cells from B6.SJL, as support. After 1-2 months after the development of leukemia primary leukemic cell lines were derived from spleen and bone marrow of sick mice by seeding into RPMI media containing 20% FBS, pen/strep and 10 ng/mL IL3.

Example 4: Mouse Strains Used in this Study

The mouse strains used in the present invention were:
Wnk1$^{tm1Clhu}$ (Wnk1$^{flox}$) (Xie et al., 2013)
Wnk1$^{tm2Clhu}$ (Wnk1$^-$) (Xie et al., 2013)
Wnk1$^{tm1.1Tyb}$ (Wnk1$^{D368A}$) (Kochl et al., 2016)
Gt(ROSA)26Sor$^{tm1(cre/ESR1)Thl}$ (R26CreERT2) (de Luca et al., 2005)
B6.SJL (The Jackson Laboratory, Stock no 000966)

To induce recombination of the different Wnk1 alleles in vitro cells were grown in the presence of 500 nM 4-hydroxytamoxifen (Sigma-Aldrich: H7904).

In vivo recombination was induced by 5 consecutive intraperitoneal injection of 1 mg Tamoxifen (Sigma-Aldrich: T5662) dissolved in sunflower oil (Sigma: 88921-250ML-F).

Example 5: Generation of Dose-Response Curves

Dose-response curves were generated using the CellTiter-Glo® assay (Promega: G7570). Cells were seeded in triplicate in round bottom 96 well plates in the presence of varying concentrations of "Compound 12". After 72 hours the number of viable cells in the cultures were measured using the CellTiter-Glo®. IC50 values were calculated using the Prism software (GraphPad: Prism 7 for Mac OS X). The experiments show that the IC50 is approximately 1 µM for MA9 cells, and >20 µM for mouse embryonic fibroblasts (FIG. 4A).

Example 6: Western Blot (WB) of Oxsr1 and P-Oxsr1

Murine MLL-AF9 transformed leukemic cells (MA9) were treated for 3 hours with different concentrations of "Compound 12". Treated cells were counted and lysed in 1×LSB buffer and an equal to 100.000 cells were loaded on each lane of a 10% SDS-Page gel.

Gels were transferred to nitrocellulose membranes probed with sheep-anti-OXSR1 [S336B] or sheep-anti-P-OXSR1 [S688B] (both from University of Dundee). Binding of the primary antibody was on detected light sensitive films, using rabbit peroxidase conjugated anti-sheep IgG antibody (1 in 30.000 dilution, Abcam: ab6900) followed by enhanced chemiluminescence (Pierce ECL Plus, ThermoFisher: 34577) (FIG. 4B).

Example 7: Growth Curves of Murine MLL-AF9 Transformed Cells in the Presence of "Compound 12"

MA9 cell cultures were grown in triplicate in 24 well plates in the presence of varying concentrations of "Compound 12". Cells were plated with a density of 50.000 cells per well after which they were counted and replated every 3 days.

The results show a dose-dependent inhibition of MA9 cell proliferation in response to "Compound 12" (FIG. 4C).

Example 8: In Vivo Treatment with "Compound 12"

$1 \times 10^4$ leukemic cells were injected into the tail vein of sub-lethally irradiated (450 rad) BL6.SJL mice. Two days after transplantation the mice were injected with 1.8 mg "Compound 12" dissolved into 200 μL sun flower oil or sun flower oil alone (control). A total of 26 mice were used in the experiment, where 14 received oil alone and 12 received "Compound 12".

The injections were continued daily for a period of 20 days.

Figure 6:
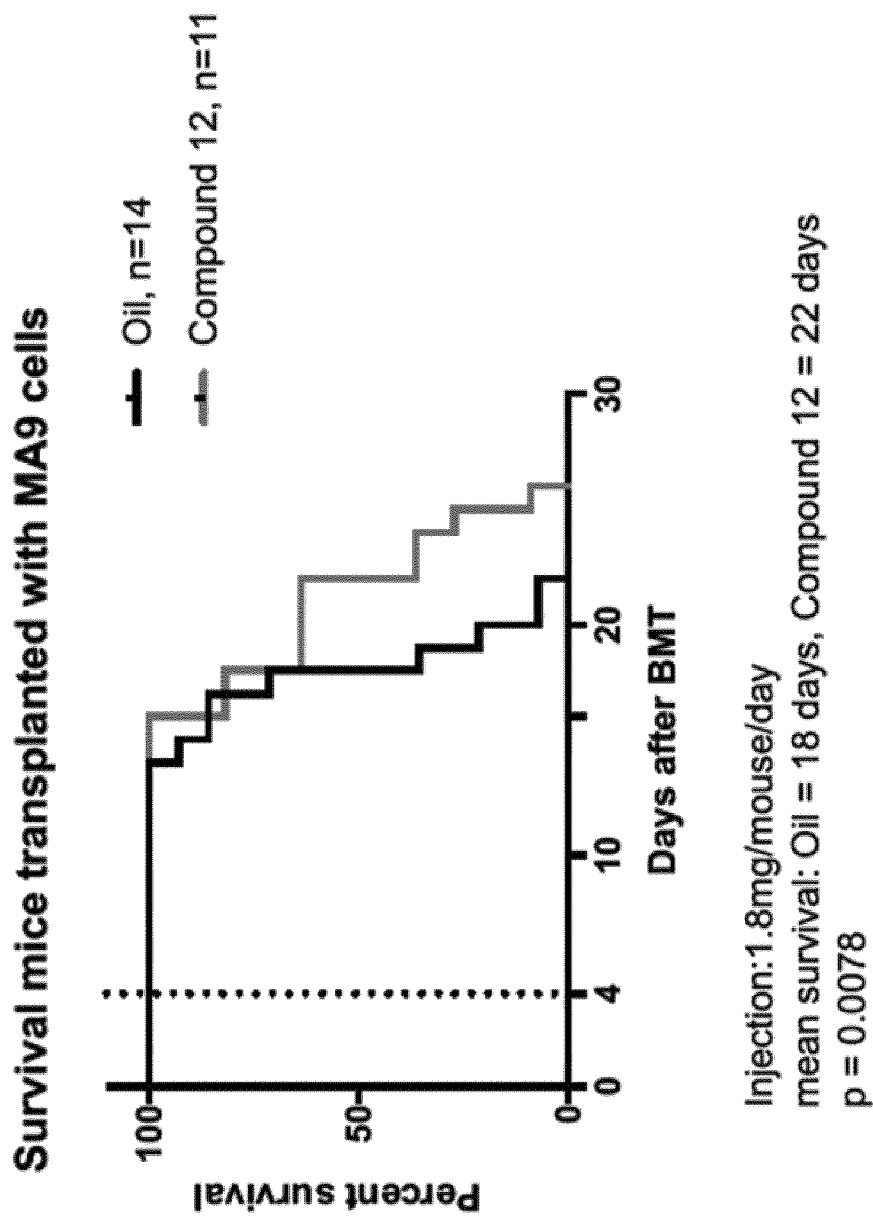
FIG. 6A shows that treatment of leukemic mice with "Compound 12" increases their lifespan. Mice were transplanted with leukemic cells (MA9) to induce acute myeloid leukemia (AML) were injected with daily 1.8 mg "Compound 12" for a total period of 18 days.

The results show that "Compound 12" significantly extend the life-time of mice injected with MA9 cells (FIG. 6).

Example 9: In Vitro GFP Dropout Experiments

MA9, MEF, THP1 and MOLM13 cell lines were transduced with pLV-Cas9-Blast (Addgene: 83481) and selected for two weeks in the presence of 4 μg/mL Blasticidin (Gibco, ThermoFisher: A1113902) to generate cell lines stably expressing Cas9. The indicated cell lines were transduced with lentiviral supernatants.

Two days after transduction the percentage GFP positive cells were measured by FACS (Becton Dickinson LSRII), which was repeated every 3 days over a period of 14 days. The data was plotted as the percentage of GFP positivity relative to day 2 after transduction (FIG. 1A-D).

Example 10: Lentiviral Transduction of Murine and Human Cell Lines

For lentivirus production, 293FT cells were co-transfected with sgRNA expressing lentiviral vectors (see above) and psPAX2 lentiviral plasmid (Addgene #12269) and pMD2.G plasmid (Addgene #12259) using the calcium phosphate transfection method.

48-72 hours after transfection viral supernatants were harvested and spun onto RetroNectin® (TaKaRa: T202) coated 6 well plates for 2 hours at 2000 g. After spinning the plates were washed briefly in PBS and cells were spun onto the plates at 400 g for 5 min.

Example 11: Generation of Dose-Response Curves for Human Cell Lines

Dose-response curves were generated using the CellTiter-Glo® assay (Promega: G7570). BJ-tert, U2OS, MOLM13, THP1, Monomac, MMS1, KMS18, KMS11, MSTo, and H226, cells were seeded in triplicate in round bottom 96 well plates in the presence of varying concentrations of "Compound 12". After 72 hours the number of viable cells in the cultures were measured using the CellTiter-Glo®. IC50 values were calculated using the Prism software (GraphPad: Prism 7 for Mac OS X). The experiment show the IC50 values for the different human cell lines (FIG. 5).

Example 12: Experiments with "Compound 12" on Other Blood Cancers

Experiments with "Compound 12" on other blood cancers than leukemia and multiple myeloma are contemplated.

Sequence Listings sgRNA oligonucleotides used in this study were:

```
(Wnk1_6):
                                  SEQ ID NO 1
TGGTCTGGCAACTCTAAAGC (Wnk1_17):
                                  SEQ ID NO 2
TCTGGACACCGAAACCACTG (Rps19):
                                  SED ID NO 3
ATTCTCTTGGTTCTAGGTCC (Nctrl):
                                  SEQ ID NO: 4
GACGTCTAATTTCTGGCCGT (WNK1_1):
                                  SEQ ID NO 5
GCCGTGGGAATGTCTAACGA (RPS19):
                                  SEQ ID NO 6
CGAATGGGTGGATACCGTCA (NCL):
                                  SEQ ID NO 7
CCCGCATGACACCGTCACTT
```

The invention claimed is:

1. A method of treating a blood cancer in a mammalian subject comprising administering an inhibitor of lysine deficient protein kinase 1 (WNK1) to a mammalian subject in need thereof, wherein the inhibitor of lysine deficient protein kinase 1 (WNK1) is (5-Chloro-2-(2-(methylamino) thiazol-4-yl)-pyridin-4-yl)(4-(4-chlorobenzyl)piperazin-1-yl)methanone) or (5-Chloro-2-(2-((methyl-$d_3$)amino)thiazol-4-yl)-pyridin-4-yl)(4-(4-chlorobenzyl)piperazin-1-yl) methanone).

2. The method of claim 1, wherein the blood cancer is selected from the group consisting of leukemia, lymphoma and myeloma.

3. The method of claim 2, wherein the leukemia is selected from the group consisting of acute myeloid leukemia (AML), acute lymphoid leukemia (ALL), chronic myeloid leukemia (CML), chronic lymphocytic leukemia (CLL) and hairy cell leukemia (HCL).

4. The method of claim 2, wherein the lymphoma is selected from the group consisting of diffuse large B-cell lymphoma (DLBCL), follicular lymphoma, small lymphocytic lymphoma (SLL), mantle cell lymphoma (MCL), marginal zone lymphomas, Burkitt lymphoma and lymphoplasmacytic lymphoma.

5. The method of claim 2, wherein the myeloma is selected from the group consisting of multiple myeloma, light chain myeloma, non-secretory myeloma, solitary plasmacytoma, extramedullary plasmacytoma, monoclonal gammopathy of undetermined significance (MGUS), smoldering multiple myeloma (SMM), immunoglobulin D (IgD) myeloma and immunoglobulin E (IgE) myeloma.

6. The method of claim 1, wherein the inhibitor of lysine deficient protein kinase 1 (WNK1) is (5-Chloro-2-(2-((methyl-$d_3$)amino)thiazol-4-yl)-pyridin-4-yl)(4-(4-chlorobenzyl)piperazin-1-yl)methanone).

7. The method of claim 1, wherein the inhibitor of lysine deficient protein kinase 1 (WNK1) is formulated into a pharmaceutical composition.

8. The method of claim 1, wherein the mammalian subject is a human subject.

\* \* \* \* \*